(12) United States Patent
Lee et al.

(10) Patent No.: US 10,775,675 B2
(45) Date of Patent: Sep. 15, 2020

(54) METHOD FOR MANUFACTURING DISPLAY DEVICE

(71) Applicant: Samsung Display Co., Ltd., Yongin-si (KR)

(72) Inventors: Hyunwook Lee, Asan-si (KR); Pilgyu Kang, Hwaseong-si (KR); Xinxing Li, Suwon-si (KR); Solip Jeong, Namyangju-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/251,715

(22) Filed: Jan. 18, 2019

(65) Prior Publication Data
US 2019/0227400 A1 Jul. 25, 2019

(30) Foreign Application Priority Data
Jan. 19, 2018 (KR) .................. 10-2018-0007163

(51) Int. Cl.
*G02F 1/1362* (2006.01)
*G02F 1/1339* (2006.01)
(Continued)

(52) U.S. Cl.
CPC ...... *G02F 1/136286* (2013.01); *G02F 1/1339* (2013.01); *G02F 1/1362* (2013.01);
(Continued)

(58) Field of Classification Search
CPC combination set(s) only.
See application file for complete search history.

(56) References Cited

U.S. PATENT DOCUMENTS

2008/0170195 A1* 7/2008 Kwon ................. G02F 1/13338
349/143
2010/0007841 A1 1/2010 Baek et al.
(Continued)

FOREIGN PATENT DOCUMENTS

KR 10-2005-0055454 6/2005
KR 10-2007-0071294 7/2007
(Continued)

*Primary Examiner* — Ratisha Mehta
(74) *Attorney, Agent, or Firm* — H.C. Park & Associates, PLC

(57) ABSTRACT

A method of manufacturing a display device including the steps of: forming, on a first mother substrate, pixels including pixel electrodes, gate lines and data lines connected to the pixels; dividing the data lines into groups and connecting the data lines of the same group to one connection line; forming inspection electrodes on the first mother substrate overlapping a shot boundary portion of a mask, the inspection electrodes connected to a plurality of connection lines, respectively; preparing a second mother substrate; forming a common electrode on the second mother substrate; forming a mother panel including the first and second mother substrates and a liquid crystal layer therebetween; applying a first voltage to the common electrode and a second voltage to the inspection electrodes; and determining whether the inspection electrodes and the common electrode are short-circuited based on an image displayed in a display area of the mother panel.

20 Claims, 12 Drawing Sheets

(51) Int. Cl.
  *G02F 1/1345* (2006.01)
  *G02F 1/1343* (2006.01)
  *G06T 7/00* (2017.01)
  *G02F 1/1333* (2006.01)
  G02F 1/1368 (2006.01)
  G02F 1/1337 (2006.01)

(52) U.S. Cl.
  CPC ...... *G02F 1/13439* (2013.01); *G02F 1/13458* (2013.01); *G02F 1/133351* (2013.01); *G02F 1/134309* (2013.01); *G02F 1/136227* (2013.01); *G06T 7/0004* (2013.01); *G02F 1/1368* (2013.01); *G02F 1/133711* (2013.01); *G02F 2001/136222* (2013.01); *G02F 2001/136254* (2013.01); *G02F 2001/136295* (2013.01); *G06T 2207/30121* (2013.01)

(56) References Cited

U.S. PATENT DOCUMENTS

| 2013/0155037 | A1 | 6/2013 | Kim et al. |
| 2016/0204127 | A1* | 7/2016 | Lee ................... G02F 1/13452 438/30 |

FOREIGN PATENT DOCUMENTS

| KR | 10-2008-0066308 | 7/2008 |
| KR | 10-2013-0070723 | 6/2013 |
| KR | 10-1487427 | 1/2015 |
| KR | 10-2017-0081057 | 7/2017 |

* cited by examiner

METHOD FOR MANUFACTURING DISPLAY DEVICE

CROSS-REFERENCE TO RELATED APPLICATION

This application claims priority from and the benefit of Korean Patent Application No. 10-2018-0007163, filed on Jan. 19, 2018, which is hereby incorporated by reference for all purposes as if fully set forth herein.

BACKGROUND

Field

Exemplary embodiments of the present invention generally relate to a display device, and more specifically, to a method of manufacturing a display device capable of detecting defects therein.

Discussion of the Background

A display device typically includes a common electrode and various signal lines, such as gate lines and data lines, etc. During manufacture of a display device, the signal lines exposed to the outside may be short-circuited with a common electrode disposed over an entire surface of an upper substrate.

However, it is generally difficult to determine whether the short circuit has occurred, and it is even more difficult to accurately identify the location of the short circuit when the short circuit is identified.

The above information disclosed in this Background section is only for understanding of the background of the inventive concepts, and, therefore, it may contain information that does not constitute prior art.

SUMMARY

Methods according to exemplary embodiments of the invention are capable of detecting a short circuit between a common electrode and signal lines, and accurately detecting the location of the short circuit.

Additional features of the inventive concepts will be set forth in the description which follows, and in part will be apparent from the description, or may be learned by practice of the inventive concepts.

A method of manufacturing a display device according to an exemplary embodiment includes the steps of: forming, on a first mother substrate, a plurality of pixels including a plurality of pixel electrodes, a plurality of gate lines connected to the pixels, and a plurality of data lines connected to the pixels; dividing the data lines into a plurality of groups, and connecting the data lines of the same group to one connection line; forming a plurality of inspection electrodes on a portion of the first mother substrate overlapping a shot boundary portion of a mask, the inspection electrodes connected to a plurality of connection lines, respectively; preparing a second mother substrate; forming a common electrode on the second mother substrate; forming a mother panel including the first and second mother substrates and a liquid crystal layer between first and second display substrates, the first and second mother substrates bonded to each other such that the inspection electrodes and the pixel electrodes face the common electrode; applying a first voltage to the common electrode and applying a second voltage different from the first voltage to the inspection electrodes; and determining whether the inspection electrodes and the common electrode are short-circuited based on an image displayed in a display area of the mother panel.

The method may further include: applying a first voltage to the common electrode, applying a second voltage different from the first voltage to the plurality of inspection electrodes, and then irradiating the mother panel with ultraviolet light.

At least one of the inspection electrodes may include a lower inspection electrode disposed on the first mother substrate and overlapping the shot boundary portion of the mask, an upper inspection electrode disposed on the lower inspection electrode, and an insulating layer disposed between the upper inspection electrode and the lower inspection electrode, in which the upper inspection electrode is connected to the lower inspection electrode through a contact hole of the insulating layer.

The lower inspection electrode and the gate lines may be disposed on the same layer.

The lower inspection electrode and the data lines may be disposed on the same layer.

The upper inspection electrode and the pixel electrodes may be disposed on the same layer.

The liquid crystal layer may include liquid crystal molecules and a prepolymer.

The prepolymer may include a reactive mesogen.

The method may further include forming a plurality of pad electrodes on the first mother substrate between an edge of the first mother substrate and the shot boundary portion of the mask, in which the pad electrodes may be connected to the inspection electrodes.

The method may further include forming a plurality of pad connection lines on the first mother substrate, in which the pad connection lines may connect the pad electrodes to the inspection electrodes.

The method may further include forming a plurality of dummy electrodes on a surface of the second mother substrate that faces the first mother substrate, in which the dummy electrodes may be connected to the pad electrodes, respectively.

The method may further include forming a short portion and a sealing portion between the pad electrode and the dummy electrode that correspond to each other.

The sealing portion may include a conductive ball.

Each of the dummy electrodes may have a concavo-convex shape.

Respective surfaces of two adjacent dummy electrodes that face each other may have a concavo-convex shape.

A convex portion of one dummy electrode and a concavo portion of an adjacent dummy electrode may face each other.

Forming of the common electrode and the dummy electrodes may include forming an opposing electrode on the second mother substrate, and cutting the opposing electrode to form the common electrode and the dummy electrodes separated from each other.

A method of detecting a short circuit between at least one signal line and a common electrode of a display device according to an exemplary embodiment includes the steps of: forming a plurality of first display substrates on a first mother substrate, each first display substrate including a plurality of signal lines; connecting a first group of signal lines to a first connection line and connecting a second group of signal lines to a second connection line; forming first and second inspection electrodes on a portion of the first mother substrate overlapping a shot boundary portion of a mask, the first and second inspection electrodes connected to the first and second connection lines, respectively; forming a plurality of second display substrates on a second mother substrate, each second display substrate including a conductive layer; separating the conductive layer to form a common electrode, a first dummy electrode, and a second dummy electrode, the first and second dummy electrodes connected to the first and second inspection electrodes, respectively; forming a liquid crystal layer between the first and second display substrates; applying a first voltage to the common electrode, and a second voltage different from the first voltage to the first and second dummy electrodes.

The first and second dummy electrodes may be disposed between adjacent common electrodes in a plan view.

The method may further include blocking a portion of the mask that corresponds to the first inspection electrode to disconnect the first inspection electrode, after the first and second voltages are applied.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
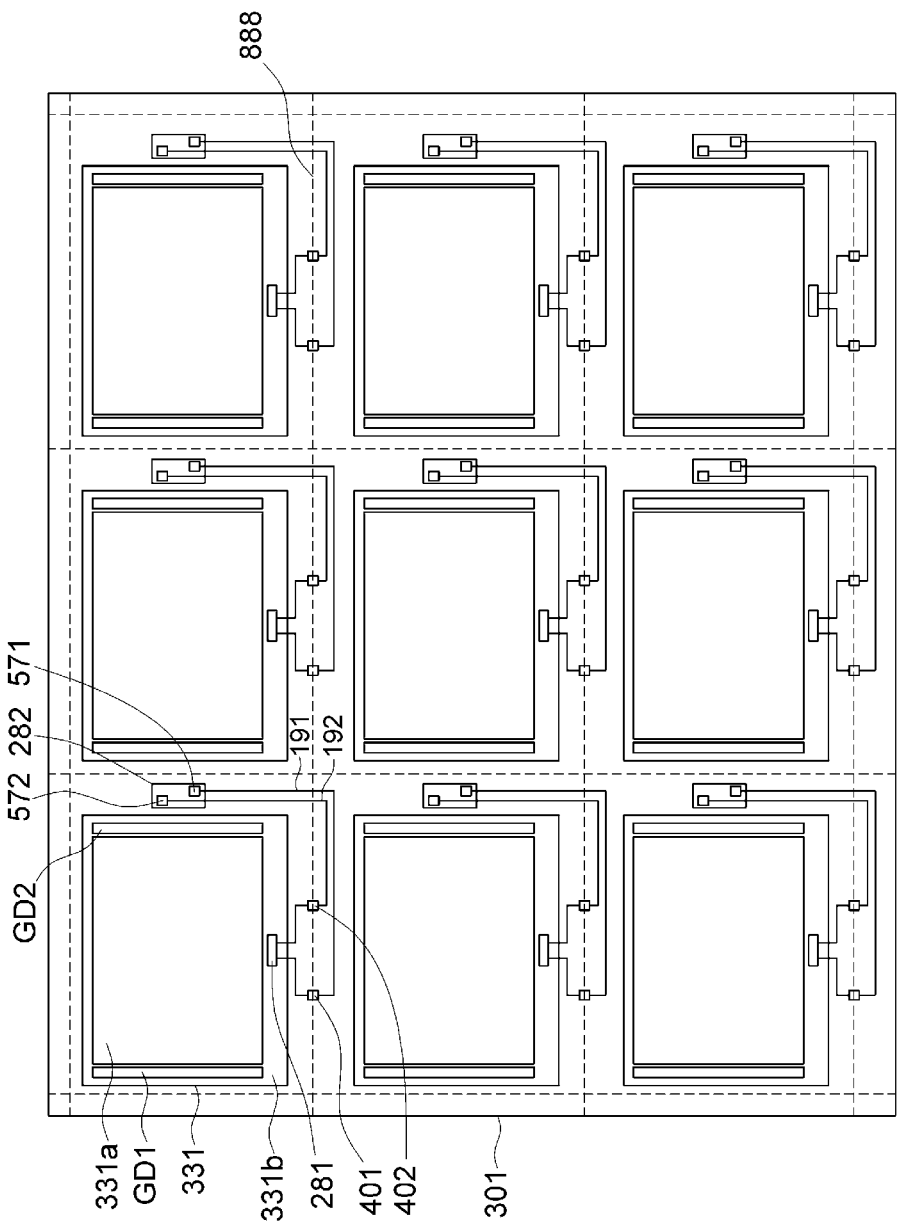
FIG. 1 is a view of a part of a first mother substrate according to an exemplary embodiment.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side"

(e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a method of manufacturing a display device according to exemplary embodiments will be described with reference to FIGS. 1 to 10.

FIG. 1 is a view of a part of a first mother substrate 301 according to an exemplary embodiment.

Referring to FIG. 1, the first mother substrate 301 according to an exemplary embodiment includes a plurality of first display substrates 331. FIG. 1 shows that the first mother substrate 301 includes nine first display substrates 331. However, the inventive concepts are not limited to the number of the first display substrates 331 formed in the first mother substrate 301.

The first display substrates 331 illustrated in FIG. 1 are in a state where they are not separated from the first mother substrate 301. That is, the first display substrates 331 and the first mother substrate 301 are unitary (e.g., in a monolithic structure). Each of the first display substrates 331 is separated from the first mother substrate 301 through a cutting process. Each edge defining each of the first display substrate 331 of FIG. 1 corresponds to a cutting line of the first mother substrate 301, for example, a scribing line.

The first display substrates 331 in the first mother substrate 301 have substantially the same configuration as each other. Hence, hereinafter, one first display substrate 331 will be described in detail.

Figure 2:
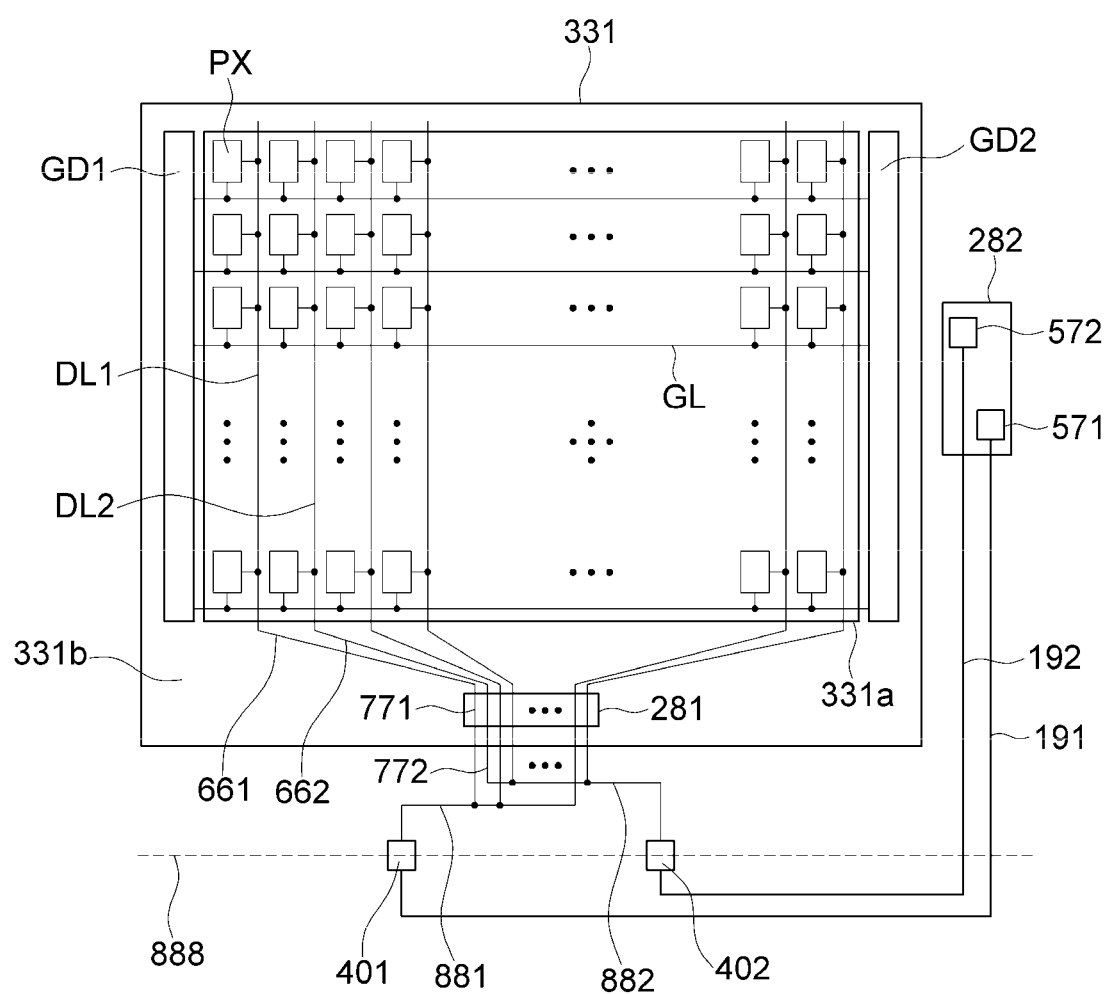
FIG. 2 is a view of one of first display substrates of the first mother substrate of FIG. 1 and a peripheral portion thereof.

FIG. 2 is a view of one of first display substrates of the first mother substrate of FIG. 1 and a peripheral portion thereof.

Referring to FIG. 2, the first display substrate 331 has a display area 331a and a non-display area 331b.

In the display area 331a of the first display substrate 331, a plurality of pixels PX, a plurality of gate lines GL, and a plurality of data lines DL1 and DL2 are disposed.

A first gate driver GD1 and a second gate driver GD2 are disposed in the non-display area 331b. The first gate driver GD1 is disposed between one edge of the first display substrate 331 and the display area 331a. The first gate driver GD1 is connected to one end portion of each of the gate lines GL. The first gate driver GD1 may drive the gate lines GL.

The second gate driver GD2 is disposed between another edge of the first display substrate 331 and the display area 331a. The other edge of the first display substrate 331 faces the one edge of the first display substrate 331. The second gate driver GD2 is connected to the other end portion of each of the gate lines GL. The second gate driver GD2 may drive the gate lines GL.

Each of the first gate driver GD1 and the second gate driver GD2 includes a plurality of driving switching elements. The driving switching elements may be manufactured in substantially the same process as manufacturing a plurality of thin film transistors (TFTs) included in the pixels PX.

An inner pad area 281 disposed in the non-display area 331b is an area to which the driver may be attached. The attaching process of the driver is performed after the cutting process of the first mother substrate 301. For example, after the first display substrate 331 is separated from the first mother substrate 301, the driver is attached to the inner pad area 281 of the separated first display substrate 331.

The driver drives the first gate driver GD1, the second gate driver GD2, and the data lines DL1 and DL2. The driver applies gate control signals to the first gate driver GD1 and the second gate driver GD2, respectively, and applies data signals (image data signals) to the data lines DL1 and DL2.

According to an exemplary embodiment, the data lines may be divided into a plurality of groups, and the data lines of the same group are connected to each other by a connection line. For example, the data lines may be divided into two groups, one group including odd-numbered data lines DL1 and the other group including even-numbered data lines DL2.

The odd-numbered data lines DL1 extend to the non-display area 331b, and are connected to odd-numbered fan-out lines 661 located in the non-display area 331b. The odd-numbered fan-out lines 661 are connected to odd-numbered extension lines 771, respectively. The odd-numbered extension lines 771 extend outside the first display substrate 331 through the inner pad area 281, and are connected to a first connection line 881.

The first connection line 881 is disposed outside the first display substrate 331. The odd-numbered extension lines 771 are connected to the first connection line 881 outside the first display substrate 331.

The first connection line 881 is connected to a first inspection electrode 401. The first inspection electrode 401 is disposed outside the first display substrate 331. In particular, the first inspection electrode 401 is disposed on a portion of the first mother substrate 301 outside the first display substrate 331. In this case, the first inspection electrode 401 is disposed to correspond to (or overlap) a shot boundary portion 888 of a mask.

The shot boundary portion 888 of the mask surrounds the first display substrate 331. In other words, the first display substrate 331 is located in the shot boundary portion 888 of the mask. The first mother substrate 301 includes mask areas corresponding to the first display substrate 331, and the shot boundary portion 888 of the mask may be a boundary between adjacent mask areas. As used herein, a mask may refer to a mask used in an exposure process, by which the first display substrates 331 are sequentially exposed.

The first inspection electrode 401 is connected to a first pad electrode 571 in an external pad area 282 through a first pad connection line 191. The external pad area 282 is located outside the first display substrate 331. For example, the external pad area 282 is disposed between an edge of the first display substrate 331 and the shot boundary portion 888 of the mask surrounding the first display substrate 331.

The even-numbered data lines DL2 extend to the non-display area 331*b,* and are respectively connected to even-numbered fan-out lines 662 disposed in the non-display area 331*b*. The even-numbered fan-out lines 662 are connected to even-numbered extension lines 772, respectively. The even-numbered extension lines 772 extend to the outside of the first display substrate 331 through the inner pad area 281. And the even-numbered extension lines 772 are connected to a second connection line 882.

The second connection line 882 is disposed outside the first display substrate 331. The even-numbered extension lines 772 are connected to the second connection line 882 outside the first display substrate 331.

The second connection line 882 is connected to a second inspection electrode 402. The second inspection electrode 402 is disposed outside the first display substrate 331. In particular, the second inspection electrode 402 is disposed on a portion of the first mother substrate 301 outside the first display substrate 331. In this case, the second inspection electrode 402 is disposed to correspond to (or overlap) the shot boundary portion 888 of the mask.

The second inspection electrode 402 is connected to a second pad electrode 572 of the external pad area 282 through a second pad connection line 192.

In an exemplary embodiment, the first gate driver GD1 and the second gate driver GD2 are configured to receive a gate control signal for inspection, which is transmitted from gate pad electrodes of the external pad area 282. The gate control signal for inspection is applied to the first and second gate drivers GD1 and GD2 through a gate pad connection line connected to the gate pad electrodes thereof. The gate pad connection line may be connected to the first and second gate drivers GD1 and GD2 through the inner pad area 281.

The gate control signal for inspection may be a ground voltage or a DC voltage higher than the ground voltage.

Figure 3:
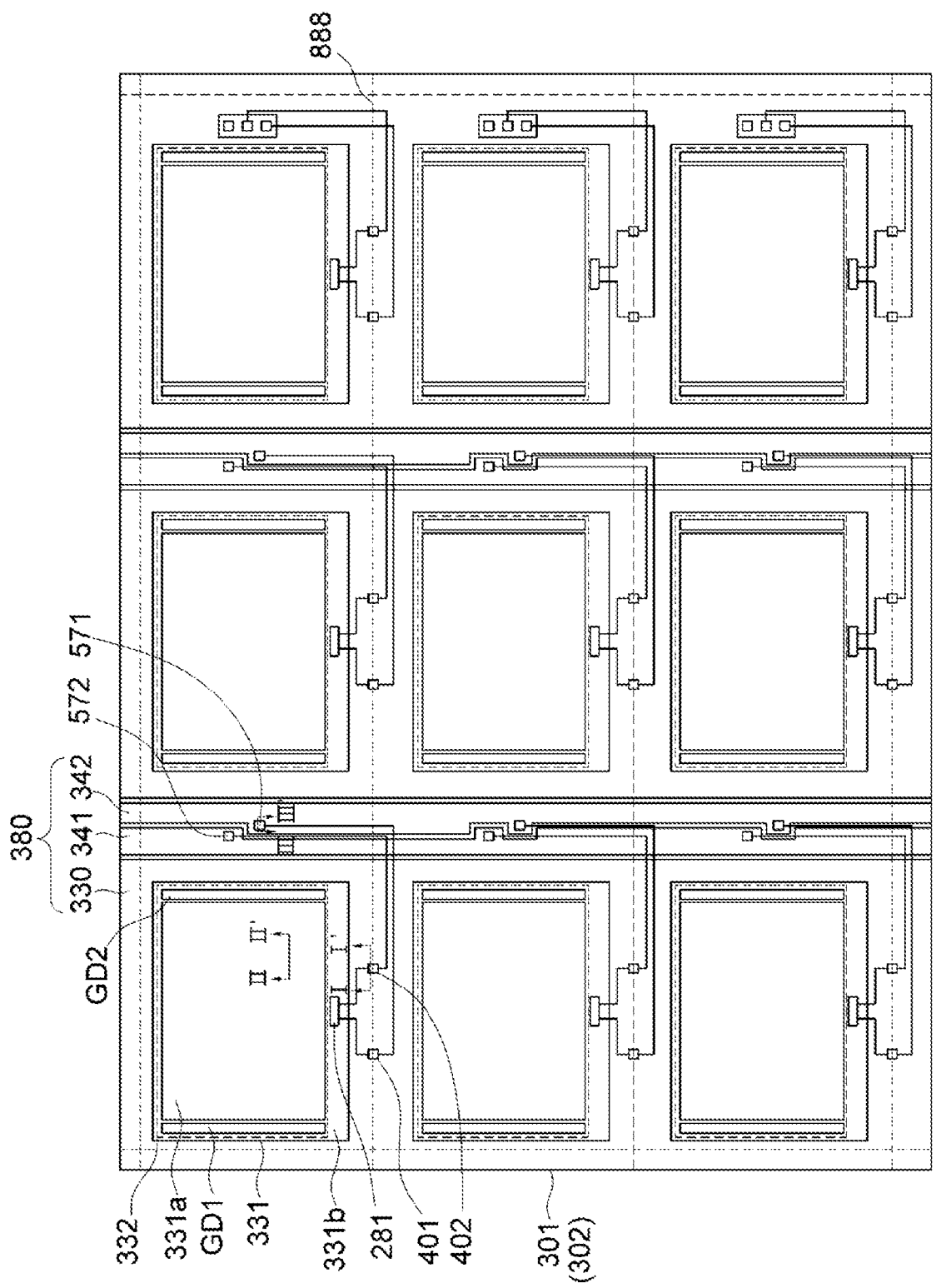
FIG. 3 is a view of a mother panel including the first mother substrate of FIG. 1 and a second mother substrate opposing the first mother substrate.
Figure 4:
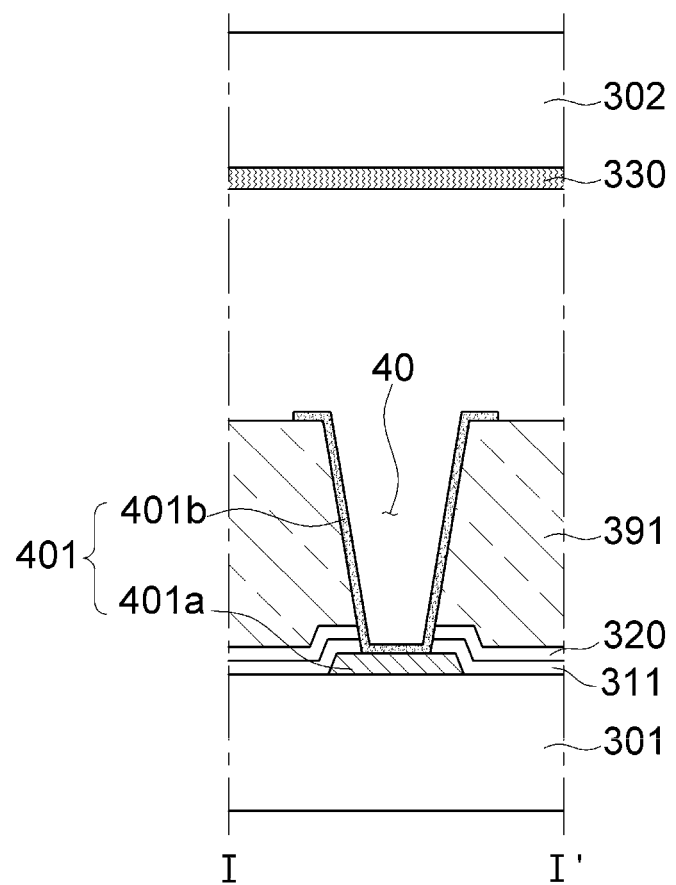
FIG. 4 is a cross-sectional view taken along line I-I' of FIG. 3.
Figure 5:
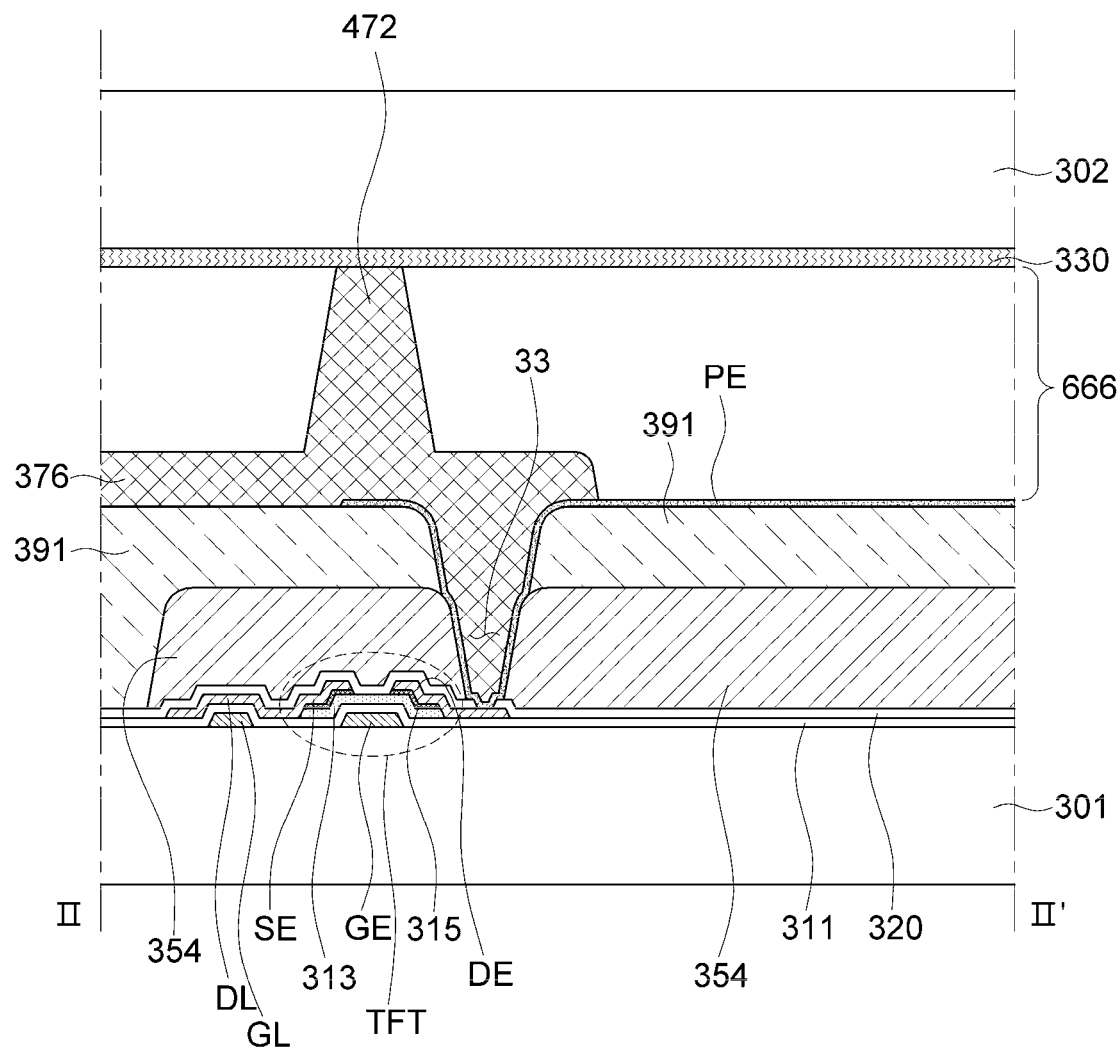
FIG. 5 is a cross-sectional view taken along line II-II' of FIG. 3.
Figure 6:
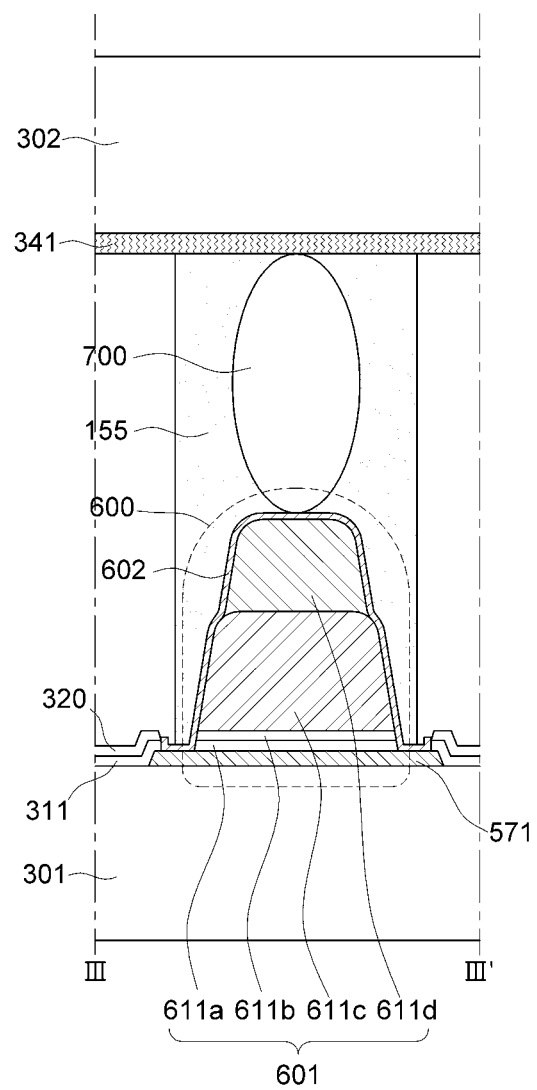
FIG. 6 is a cross-sectional view taken along line III-III' of FIG. 3.

FIG. 3 is a view of a mother panel including the first mother substrate of FIG. 1 and a second mother substrate 302 opposing the first mother substrate. FIG. 4 is a cross-sectional view taken along line I-I' of FIG. 3. FIG. 5 is a cross-sectional view taken along line II-II' of FIG. 3. FIG. 6 is a cross-sectional view taken along line III-III' of FIG. 3.

Referring to FIGS. 3 and 4, the mother panel includes the first mother substrate 301 and the second mother substrate 302 opposing each other, and a liquid crystal layer 666 disposed between the first display substrate 331 and a second display substrate 332.

An opposing electrode 380 is disposed on a surface of the second mother substrate 302 that faces the first mother substrate 301. The opposing electrode 380 includes a common electrode 330, a first dummy electrode 341, and a second dummy electrode 342 separated from each other, as illustrated in FIGS. 3, 4, and 5.

Each of the first dummy electrode 341 and the second dummy electrode 342 may have a concavo-convex shape. For example, respective surfaces of the first dummy electrode 341 and the second dummy electrode 342 that face each other may have a concavo-convex shape. In this case, a convex portion of the first dummy electrode 341 faces a concavo portion of the second dummy electrode 342, and a concavo portion of the first dummy electrode 341 faces a convex portion of the second dummy electrode 342.

The common electrode 330 overlaps the first inspection electrode 401 and the second inspection electrode 402.

The first dummy electrode 341 overlaps the first pad electrode 571 of the external pad area 282. The first dummy electrode 341 is connected to the first pad electrode 571. In this case, as illustrated in FIG. 6, the first dummy electrode 341 may be connected to the first pad electrode 571 through a first short portion 600 and a conductive ball 700 between the first dummy electrode 341 and the first pad electrode 571.

The first short portion 600 includes a protrusion portion 601 and a connection electrode 602. The protrusion portion 601 is disposed on the first pad electrode 571, and the connection electrode 602 is disposed on the first pad electrode 571 and the protrusion portion 601.

The protrusion portion 601 may include a plurality of protrusion patterns disposed on different layers. For example, the protrusion portion 601 may include first, second, third, and fourth protrusion patterns 611*a,* 611*b,* 611*c,* and 611*d,* which are vertically stacked one over another as illustrated in FIG. 6.

The plurality of protrusion patterns included in the protrusion portion 601 may include materials different from each other. For example, the first, second, third, and fourth protrusion patterns 611*a,* 611*b,* 611*c,* and 611*d* may respectively include different materials from each other.

The first protrusion pattern 611*a* may be disposed on the same layer on which a gate insulating layer 311 is disposed. The first protrusion pattern 611*a* and the gate insulating layer 311 may be substantially simultaneously manufactured using the same material.

The second protrusion pattern 611*b* may be disposed on the same layer on which a protective layer 320 is disposed. The second protrusion pattern 611*b* and the protective layer 320 may be substantially simultaneously manufactured using the same material.

The third protrusion pattern 611*c* may be disposed on the same layer on which a color filter layer 354 is disposed. The third protrusion pattern 611*c* and the color filter layer 354 may be manufactured substantially simultaneously using the same material. In this case, the third protrusion pattern 611*c* may include the same material as a material included in one of a red color filter, a green color filter, and a blue color filter. According to an exemplary embodiment, the third protrusion pattern 611*c* may include the same material included in the color filter having the lowest light transmittance. For example, the third protrusion pattern 611c may include the same material included in the blue color filter. According to another exemplary embodiment, the third protrusion pattern 611c may include the same material included in the color filter having the greatest thickness. For example, when the blue color filter has the greatest thickness, the third protrusion pattern 611c may include the same material included in the blue color filter.

The fourth protrusion pattern 611d may be disposed on the same layer on which an insulating interlayer 391 is disposed. The fourth protrusion pattern 611d and the insulating interlayer 391 may be manufactured substantially simultaneously using the same material. Alternatively, the protrusion portion 601 may include only the first, second, and third protrusion patterns 611a, 611b, and 611c, and the fourth protrusion pattern 611d may be omitted.

The connection electrode 602 is disposed on the first pad electrode 571 and the fourth protrusion pattern 611d. In this case, the connection electrode 602 is connected to the first pad electrode 571 through a contact hole passing through the gate insulating layer 311 and the protective layer 320. The connection electrode 602 is connected to the common electrode 330 through the conductive ball 700 included in a sealing portion 155. As used herein, the sealing portion 155 is different from the sealing portion surrounding the liquid crystal layer 666 described above.

The second dummy electrode 342 overlaps the second pad electrode 572 of the external pad area 282. The second dummy electrode 342 is connected to the second pad electrode 572. Although not illustrated, the second dummy electrode 342 may be connected to the second pad electrode 572 through a second short portion and a conductive ball between the second dummy electrode 342 and the second pad electrode 572. The second short portion may have a configuration substantially the same as a configuration of the first short portion 600 described above.

A common voltage is applied to the common electrode 330, and a voltage different from the common voltage, for example, a ground voltage, may be applied to each of the first and second dummy electrodes 341 and 342. The common voltage may be a DC voltage in a range from about 10V to about 15V, and the ground voltage may be about 0V.

Referring to FIG. 4, the first inspection electrode 401 may include a lower inspection electrode 401a and an upper inspection electrode 401b.

The lower inspection electrode 401a is disposed on the first display substrate 331. The lower inspection electrode 401a is disposed to correspond to the shot boundary portion 888 of the mask.

The upper inspection electrode 401b is disposed on the lower inspection electrode 401a. For example, the upper inspection electrode 401b is disposed on the insulating layers 311, 320, and 391, and overlaps the lower inspection electrode 401a. The insulating layers may include the gate insulating layer 311, the protective layer 320, and the insulating interlayer 391.

The upper inspection electrode 401b is connected to the lower inspection electrode 401a exposed through a contact hole 40 that passes through the insulating layers 311, 320 and 391.

Hereinafter, components of the display device including the lower inspection electrode 401a and the upper inspection electrode 401b will be described in detail.

As illustrated in FIGS. 4 and 5, the lower inspection electrode 401a, the gate line GL, the data line DL, the thin film transistor TFT, the gate insulating layer 311, the protective layer 320, the color filter layer 354, the insulating interlayer 391, the upper inspection electrode 401b, a pixel electrode PE, and a light blocking portion 376 are disposed on the first mother substrate 301.

A pixel switching element (hereinafter, "thin film transistor TFT") includes a gate electrode GE, a semiconductor layer 313, an ohmic contact layer 315, a source electrode SE, and a drain electrode DE.

The gate line GL, the gate electrode GE, and the lower inspection electrode 401a are disposed on the first mother substrate 301. In this case, a connection portion (e.g., an end portion) of the gate line GL may be greater in size than other portions thereof for connection with another layer or an external driving circuit.

At least one of the gate line GL, the gate electrode GE, and the lower inspection electrode 401a may include one of aluminum (Al), silver (Ag), copper (Cu), or molybdenum (Mo), or alloys thereof. Alternatively, at least one of the gate line GL, the gate electrode GE, and the lower inspection electrode 401a may include one of chromium (Cr), tantalum (Ta), and/or titanium (Ti). In an exemplary embodiment, at least one of the gate line GL, the gate electrode GE, and the lower inspection electrode 401a may have a multilayer structure including at least two conductive layers having different physical properties.

The gate insulating layer 311 is disposed on the gate line GL, the gate electrode GE, and the lower inspection electrode 401a. The gate insulating layer 311 may be disposed over an entire surface of the first mother substrate 301 including the gate line GL, the gate electrode GE, and the lower inspection electrode 401.

The gate insulating layer 311 may include silicon nitride ($SiN_x$) or silicon oxide ($SiO_x$). The gate insulating layer 311 may have a multilayer structure including at least two insulating layers having different physical properties.

The semiconductor layer 313 is disposed on the gate insulating layer 311. The semiconductor layer 313 overlaps the gate electrode GE. The semiconductor layer 313 may include amorphous silicon, polycrystalline silicon, or the like.

The ohmic contact layer 315 is disposed on the semiconductor layer 313. The semiconductor layer 321 may include silicide or n+ hydrogenated amorphous silicon doped with n-type impurities, such as phosphorus (P), at high concentration. The ohmic contact layer 315 may be disposed on the semiconductor layer 313 in pairs.

The source electrode SE is disposed on a portion of the ohmic contact layer 315 that contacts a portion of the semiconductor layer 313. The source electrode SE extends from the data line DL. The source electrode SE overlaps the semiconductor layer 313 and the gate electrode GE. The source electrode SE may include a refractory metal, such as molybdenum, chromium, tantalum, titanium, and/or an alloy thereof. The source electrode SE may have a multilayer structure including a refractory metal layer and a low resistance conductive layer. Examples of the multilayer structure may include a double-layer structure including a chromium or molybdenum (alloy) lower layer and an aluminum (alloy) upper layer, and a triple-layer structure including a molybdenum (alloy) lower layer, an aluminum (alloy) intermediate layer, and a molybdenum (alloy) upper layer. Alternatively, the source electrode SE may include any suitable metals and/or conductors rather than the aforementioned materials.

The drain electrode DE is disposed on a portion of the ohmic contact layer 315 that contacts another portion of the semiconductor layer 313. The drain electrode DE overlaps the gate electrode GE and the semiconductor layer 313. The drain electrode DE is connected to the pixel electrode PE. The drain electrode DE may include the same material and have substantially the same structure (a multilayer structure) as those of the source electrode SE. The drain electrode DE and the source electrode SE may be formed substantially simultaneously in substantially the same process.

The gate electrode GE, the source electrode SE, and the drain electrode DE together with the semiconductor layer 313 and the ohmic contact layer 315 may define a thin film transistor TFT. A channel of the thin film transistor TFT is disposed at a portion of the semiconductor layer 313 between the source electrode SE and the drain electrode DE. The portion of the semiconductor layer 313 corresponding to the channel portion has a thickness less than other portions thereof.

The data line DL is disposed on the gate insulating layer 311. Although not illustrated, a connection portion (e.g., an end portion) of the data line DL may be greater in size than other portions thereof for connection with another layer or an external driving circuit. The data line DL crosses the gate line GL. Although not illustrated, a portion of the data line DL that crosses the gate line GL may have a width less than other portions of the data line DL. Accordingly, parasitic capacitance between the data line DL and the gate line GL may be reduced. The data line DL may also include the same material and have substantially the same structure (a multilayer structure) as those of the source electrode SE. The data line DL and the source electrode SE may be formed substantially simultaneously in substantially the same process.

The protective layer 320 is disposed on the data line DL, the source electrode SE, the drain electrode DE, and the gate insulating layer 311. The protective layer 320 may be disposed over the entire surface of the first mother substrate 301 including the data line DL, the source electrode SE, the drain electrode DE, and the gate insulating layer 311.

The protective layer 320 may include an inorganic insulating material, such as silicon nitride ($SiN_x$) or silicon oxide ($SiO_x$). In this case, an inorganic insulating material having photosensitivity and a dielectric constant of about 4.0 may be used. Alternatively, the protective layer 320 may have a double-layer structure including a lower inorganic layer and an upper organic layer, which is generally known as having excellent insulating characteristics and prevents damages to an exposed portion of the semiconductor layer 313. The protective layer 320 may have a thickness equal to or greater than about 5000 Å, e.g., in a range from about 6000 Å to about 8000 Å.

The color filter layer 354 is disposed on the protective layer 320. An edge of the color filter layer 354 is disposed on the gate line GL, the thin film transistor TFT, and the data line DL. The edge of the color filter layer 354 may overlap an edge of another color filter layer adjacent thereto. The color filter layer 354 may include a photosensitive organic material.

The insulating interlayer 391 is disposed on the color filter layer 354 and the protective layer 320. The insulating interlayer 391 may be disposed over an entire surface of the first mother substrate 301 including the color filter layer 354 and the protective layer 320. The insulating interlayer 391 may include an organic material.

The pixel electrode PE is disposed on the insulating interlayer 320. For example, the pixel electrode PE is disposed on the insulating interlayer 320 and correspond to a pixel area defined by the light blocking portion 376. The pixel electrode PE is connected to the drain electrode DE through a drain contact hole 33 that passes through the insulating interlayer 320, the color filter layer 354, and the protective layer 320. The pixel electrode PE may include a transparent conductive material, such as indium tin oxide (ITO) or indium zinc oxide (IZO). In this case, ITO may be a polycrystalline material or a monocrystalline material, and IZO may also be a polycrystalline material or a monocrystalline material.

The upper inspection electrode 401b is disposed on the insulating interlayer 320. The upper inspection electrode 401b is connected to the lower inspection electrode 401a through the contact hole 40 passing through the insulating interlayer 391, the protective layer 320, and the gate insulating layer 311. The upper inspection electrode 401b may include the same material included in the pixel electrode PE described above.

The light blocking portion 376 is disposed on the pixel electrode PE and the insulating interlayer 391. The light blocking portion 376 has an opening that defines the pixel area.

A column spacer 472 may be disposed on the light blocking portion 376. The column spacer 472 has a shape that protrudes toward the second mother substrate 302 at a predetermined height. The column spacer 472 may provide a constant cell gap between the first mother substrate 301 and the second mother substrate 302. The column spacer 472 may be formed unitarily with the light blocking portion 376. In this case, the column spacer 472 and the light blocking portion 376 may substantially simultaneously manufactured using the same material.

In an exemplary embodiment, the light blocking portion 376 may be disposed on the second mother substrate 302 rather than on the first mother substrate 301.

On the second mother substrate 302, the common electrode 330, the first dummy electrode 341, and the second dummy electrode 342 are disposed.

The liquid crystal layer 666 is disposed between the second mother substrate 302 and the first mother substrate 301. The liquid crystal layer 666 is disposed in an area surrounded by the first display substrate 331, the second display substrate 332, and a sealing portion having a closed loop shape, and disposed between the first display substrate 331 and the second display substrate 332.

In an exemplary embodiment, the connection lines 881 and 882 may be formed with the same material forming the lower inspection electrode 401a. The connection lines 881 and 882 may be disposed on the same layer on which the lower inspection electrode 401a is disposed. For example, the connection lines 881 and 882 may be disposed on the first mother substrate 301. The first connection line 881 may be formed unitarily with the lower inspection electrode 401a.

FIGS. 7A to 7H are cross-sectional views illustrating a process of manufacturing a display device according to an exemplary embodiment.

Figure 7A:
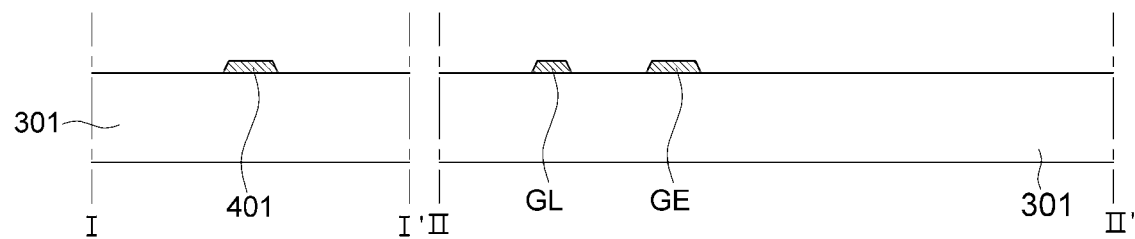
FIGS. 7A, 7B, 7C, 7D, 7E, 7F, 7G, and 7H are cross-sectional views illustrating a process of manufacturing a display device according to an exemplary embodiment.

First, as illustrated in FIG. 7A, a portion of the first inspection electrode 401 (e.g., the lower inspection electrode 401a), the gate line GL, and the gate electrode GE are formed on the first mother substrate 301.

Figure 7B:
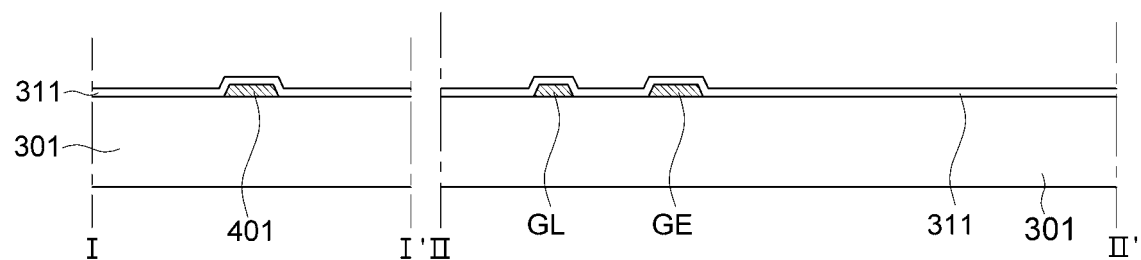

Next, as illustrated in FIG. 7B, the gate insulating layer 311 is formed on the first mother substrate 301 including the lower inspection electrode 401a, the gate line GL, and the gate electrode GE.

Figure 7C:
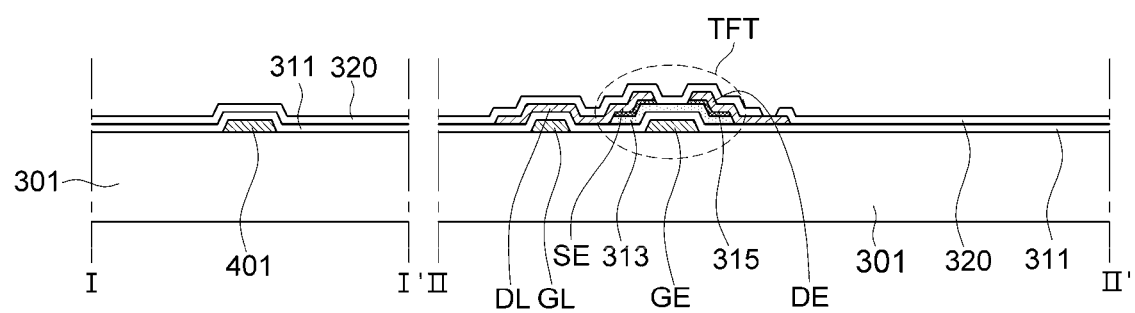

Then, as illustrated in FIG. 7C, the semiconductor layer 313 overlapping the gate electrode GE is formed on the gate insulating layer 311.

Next, the ohmic contact layer 315, the source electrode SE, and the drain electrode DE are formed in a portion of the semiconductor layer 313 other than the channel area. In addition, the data line DL connected to the source electrode SE is formed. Accordingly, a thin film transistor TFT connected to the gate line GL and the data line DL is formed.

Figure 7D:
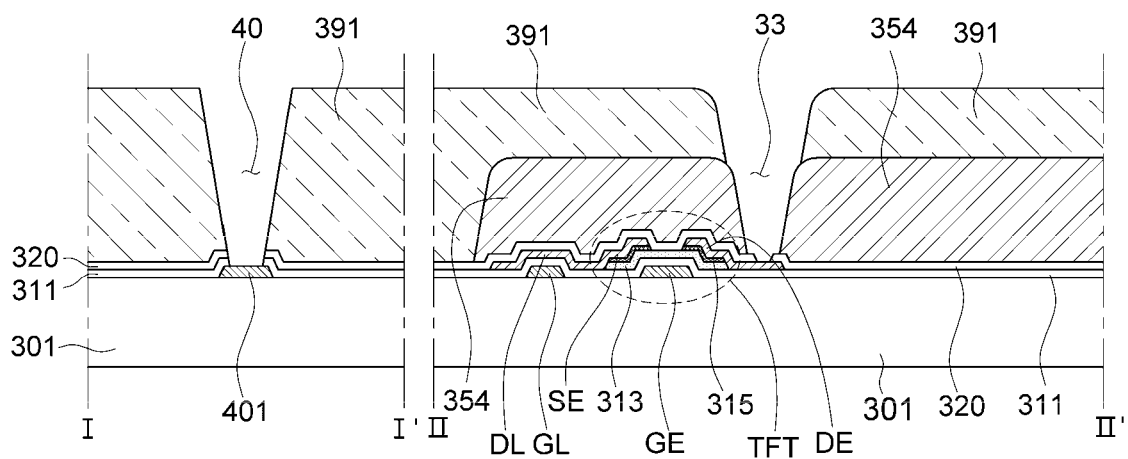

Next, as illustrated in FIG. 7D, the protective layer 320, the color filter layer 354, and the insulating interlayer 391 are formed on the thin film transistor TFT. The protective layer 320 and the insulating interlayer 391 are formed on the lower inspection electrode 401a.

Next, the drain contact hole 33 passing through the color filter layer 354, the insulating interlayer 391, and the protective layer 320, and the contact hole 40 passing through the insulating interlayer 391, the protective layer 320, and the gate insulating layer 311 are defined.

Figure 7E:
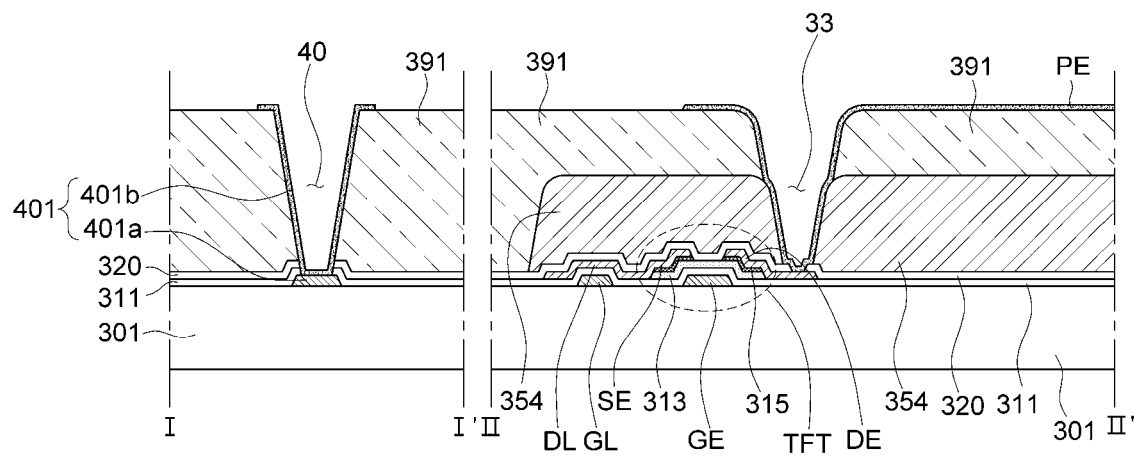

Next, as illustrated in FIG. 7E, the pixel electrode PE connected to the drain electrode DE of the thin film transistor TFT through the drain contact hole 33 is formed on the insulating interlayer 391. In this case, the upper inspection electrode 401b connected to the lower inspection electrode 401a through the contact hole 40 is formed on the insulating interlayer 391.

Next, the opposing electrode 330 is formed on the second mother substrate 302. Thereafter, the opposing electrode 330 is cut, for example, by a laser, and divided into the common electrode 330, the first dummy electrode 341, and the second dummy electrode 342.

Figure 7F:
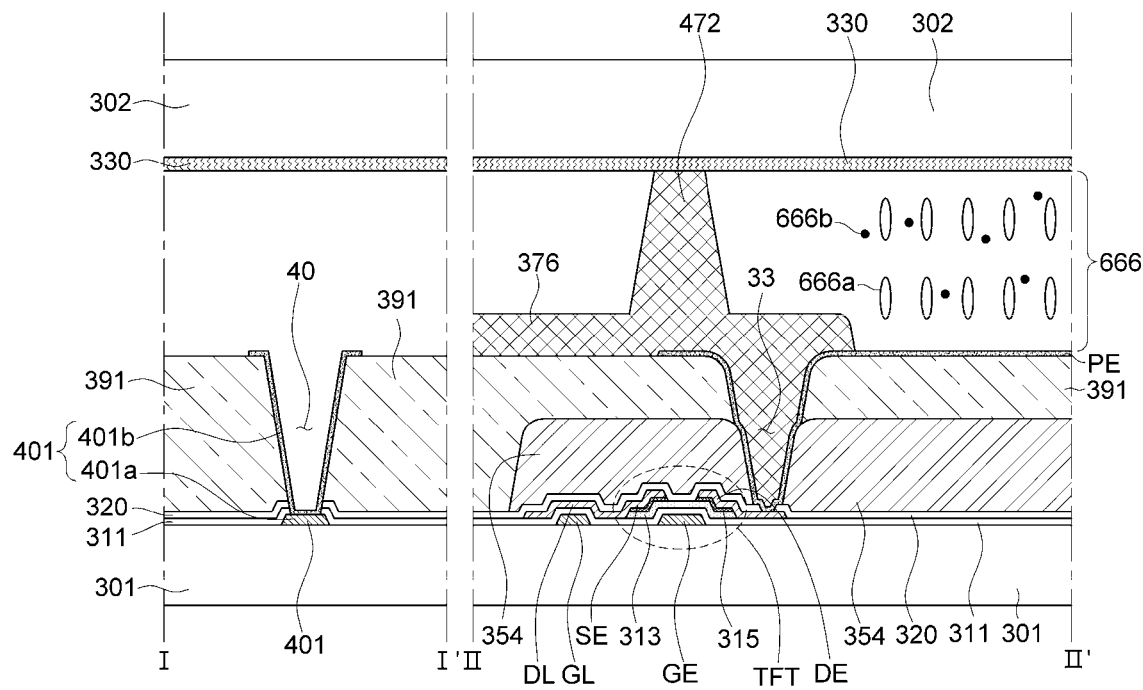

Next, as illustrated in FIG. 7F, the first mother substrate 301 and the second mother substrate 302 are bonded together, and the liquid crystal layer 666 is formed between the first mother substrate 301 and the second mother substrate 302. The first dummy electrode 341 is connected to the first short portion 600 of the first mother substrate 301 (see FIG. 6), and the second dummy electrode 342 is connected to the second short portion of the first mother substrate 301. In such case, the respective short portions are connected to the first and second dummy electrodes 341 and 342 through the conductive balls 700 of the sealing portion 155, respectively.

Figure 7G:
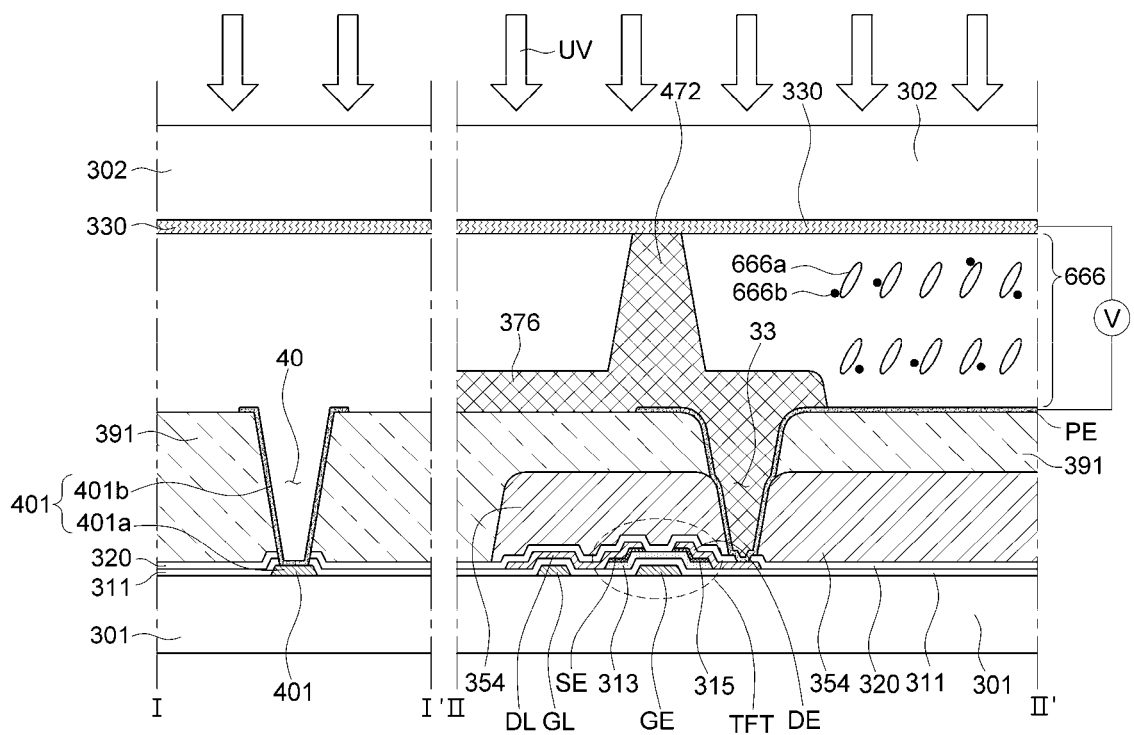

The liquid crystal layer 666 includes liquid crystal molecules 666a and a prepolymer 666b. The prepolymer 666b may include a monomer that may be cured by polymerization with light, such as ultraviolet (UV) light, as shown in FIG. 7G. For example, the prepolymer 666b may be a reactive mesogen that undergoes a polymerization reaction with light, such as UV light.

Then, a common voltage is applied to the common electrode 330, and a ground voltage is applied to each of the first dummy electrode 341 and the second dummy electrode 342. In addition, a ground voltage is applied to the gate lines GL.

The ground voltage of the first dummy electrode 341 is applied to the lower inspection electrode 401a and the upper inspection electrode 401b of the first inspection electrode 401 through the first short portion 600 and the first pad electrode 571. In addition, the ground voltage of the lower inspection electrode 401a of the first inspection electrode 401 is applied to the odd-numbered data lines DL1 through the first connection line 881, the odd-numbered extension lines 771, and the odd-numbered fan-out lines 661.

The ground voltage of the second dummy electrode 342 is applied to the lower inspection electrode and the upper inspection electrode of the second inspection electrode 402 through the second short portion and the second pad electrode 572. The ground voltage of the lower inspection electrode of the second inspection electrode 402 is applied to the even-numbered data lines DL2 through the second connection line 882, the even-numbered extension lines 772, and the even-numbered fan-out lines 662.

In addition, the first gate driver GD1 and the second gate driver GD2 apply a ground voltage to the gate lines GL. In an exemplary embodiment, the first gate driver GD1 and the second gate driver GD2 may apply a DC voltage higher than the ground voltage to the gate lines GL.

Accordingly, a ground voltage is applied to each of the gate electrode and the source electrode of the thin film transistor TFT of each pixel PX. Then, the ground voltage is applied to the pixel electrode PE of each pixel PX due to current leakage of each thin film transistor TFT.

Accordingly, the common voltage is applied to the common electrode 330, and the ground voltage is applied to each of the pixel electrodes PE. An electric field is generated in accordance with a difference between the common voltage of the common electrode 330 and the ground voltage of the pixel electrodes PE, and this electric field is applied to the liquid crystal layer 666.

In this case, the liquid crystal molecules 666a of the liquid crystal layer 666 are tilted to a specific inclination angle in response to the electric field, as illustrated in FIG. 7G.

Figure 7H:
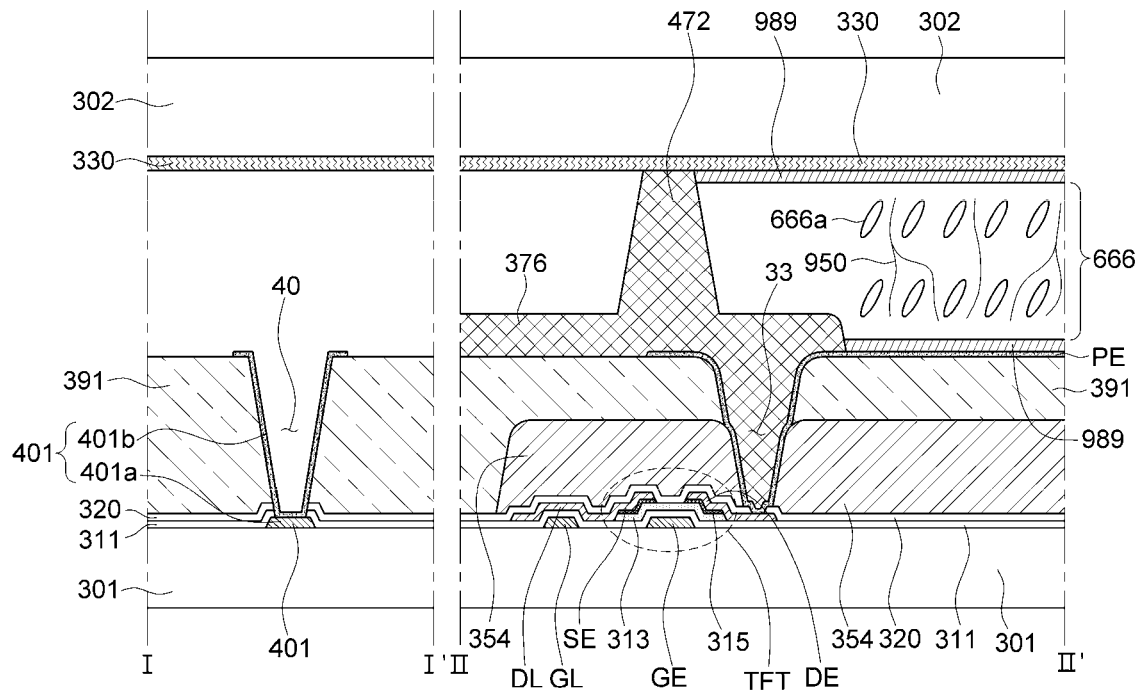

Next, when electric field is applied to the liquid crystal layer 666, irradiating light, such as UV light to the liquid crystal layer 666 triggers polymerization reaction in the prepolymer 666b. Accordingly, as illustrated in FIG. 7H, a first polymer 950 and a second polymer 989 are formed.

The first polymer 950 is formed in the liquid crystal layer 666 and the second polymer 989 is formed in contact with the first mother substrate 301 and the second mother substrate 302. The liquid crystal molecules 666a are pre-tilted by the first and second polymers 950 and 989.

According to an exemplary embodiment, when at least one of the first inspection electrode 401 and the second inspection electrode 402 is connected to the common electrode 330, the above-described liquid crystal molecules 666a may not be pre-tilted, which will be described in more detail with reference to FIG. 8.

Figure 8:
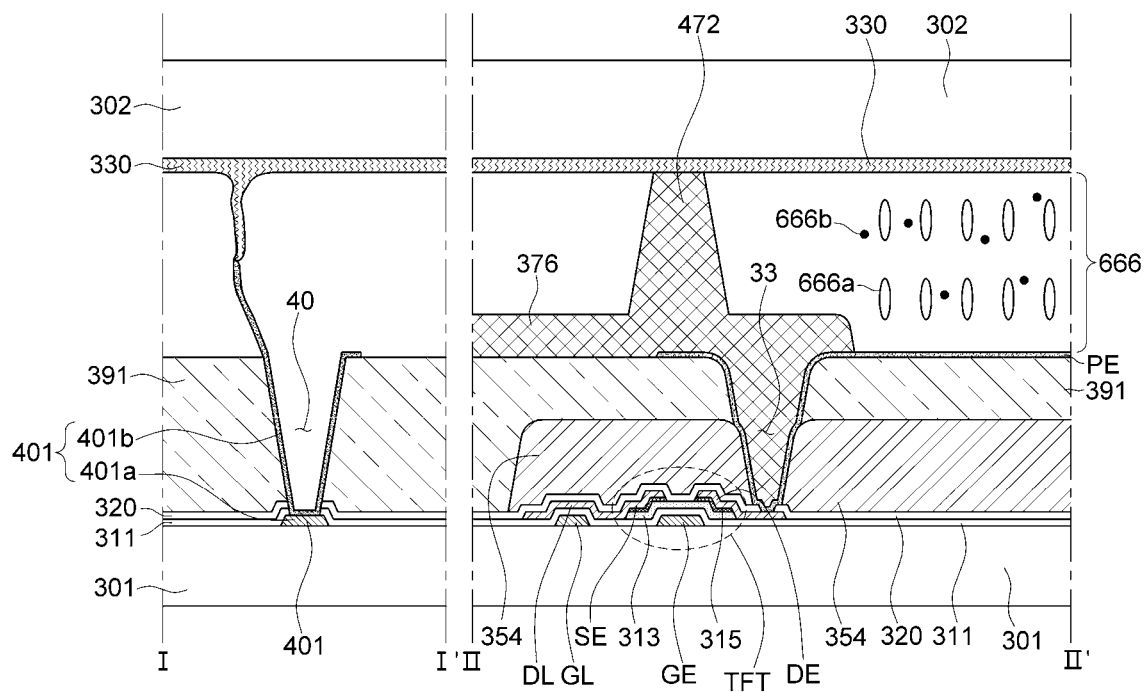
FIG. 8 is a view illustrating a short circuit between a first inspection electrode and a common electrode according to an exemplary embodiment.

FIG. 8 is an explanatory view illustrating a short circuit between the first inspection electrode 401 and the common electrode 330.

As illustrated in FIG. 8, the upper inspection electrode 401b of the first inspection electrode 401 may be connected to the common electrode 330 due to a process problem.

In this case, the voltage of the common electrode 330 may be applied to the odd-numbered data lines DL1 through the upper inspection electrode 401b and the lower inspection electrode 401a. Then, the common voltage is applied to pixel electrodes of pixels PX that are connected to the odd-numbered data lines DL1 (hereinafter, "odd-numbered pixel electrodes"). Accordingly, an equal potential is formed between the odd-numbered pixel electrodes and the common electrode 330. Then, as illustrated in FIG. 8, the liquid crystal molecules 666a disposed between the odd-numbered pixel electrodes and the common electrode 330 are not pre-tilted. That is, the liquid crystal molecules 666a between the odd-numbered pixel electrodes and the common electrode 330 are not inclined in a specific direction.

As such, when the first inspection electrode 401 is connected to the common electrode 330 as described above, while the second inspection electrode 402 is not connected to the common electrode 330, the normal ground voltage is applied to pixel electrodes of pixels PX that are connected to the even-numbered data lines DL2 (hereinafter, "even-numbered pixel electrodes"). In this case, pixels including the odd-numbered pixel electrodes (hereinafter, "odd-numbered pixels") and pixels including the even-numbered pixel electrodes (hereinafter, "even-numbered pixels") display images different from each other. Accordingly, it may be determined which of the first inspection electrode 401 and the second inspection electrode 402 is connected to the common electrode 330 by verifying the images displayed.

When a short circuit occurs in the first inspection electrode 401 as described above, there is a high possibility that the signal lines around the first inspection electrode 401 are also connected to the common electrode. Accordingly, in the method of inspecting a display device according to an exemplary embodiment, the location of the signal lines that are short-circuited with the common electrode may be easily specified.

In general, the common electrode 330 is often short-circuited with the signal lines at the shot boundary portion 888 of the mask M during the process of manufacturing display devices.

When a short-circuit failure of the common electrode does not occur, the mother panel is cut in units of a unit panel. Each of the unit panels includes first and second display substrates bonded to each other, and a liquid crystal layer interposed between the first and second display substrates.

Meanwhile, when neither the first inspection electrode 401 nor the second inspection electrode 402 is connected to the common electrode 330 after the short-circuit inspection process as described above, it may be determined that there is no problem in the display device manufactured in the manner described above. Then, the upper inspection electrode 401b may be changed to a floating state when manufacturing subsequent display device. This because the first inspection electrode 401 and the second inspection electrode 402 themselves may cause another short circuit problem, which will be described in detail with reference to FIGS. 9A and 9B.

Figure 9A:
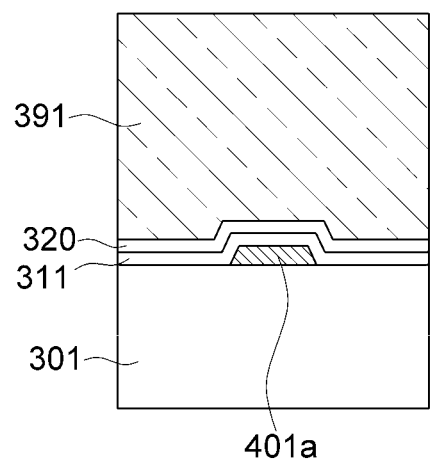
FIGS. 9A and 9B are views illustrating a method of deactivating an upper inspection electrode according to an exemplary embodiment.
Figure 9B:
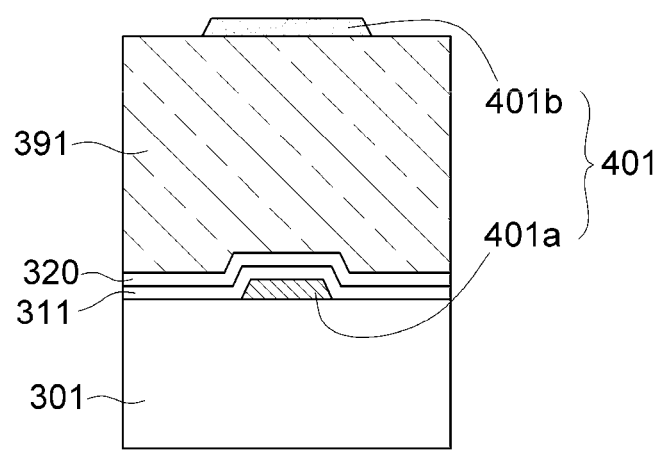

FIGS. 9A and 9B are explanatory views illustrating a method of deactivating the upper inspection electrode 401b.

Since patterns of the first mother substrates 301 of the same kind are manufactured using the same mask M, the same mask M used to manufacture a first one of the first mother substrate 301 is used to manufacture a second one of the first mother substrate 301. Accordingly, as illustrated in FIG. 9A, the mask M used to pattern the insulating interlayer 391 has an opening 999 corresponding to the contact hole 40 described above.

When the second first mother substrate 301 is manufactured using the mask M, the upper inspection electrode 401b and the lower inspection electrode 401a may be connected to each other through the contact hole 40. In order to substantially prevent this, a blade B may be used in the exposure process.

The blade B may cover an edge of the mask M to substantially prevent exposure unevenness that may be caused by diffraction of light at the edge of the mask M during the exposure process. The blade B may be disposed inwardly with respect to the edge. More particularly, the blade B may be disposed on the mask M to cover the opening 999 of the mask M.

When the exposure process is performed while the blade B covers the opening 999 of the mask M as illustrated in FIG. 9A, the insulating interlayer 391 on the lower inspection electrode 401a may not be removed and remain as it is. Accordingly, as illustrated in FIG. 9B, the upper inspection electrode 401b formed on the insulating interlayer 391 thereafter is not connected to the lower inspection electrode 401a. Accordingly, the first inspection electrode 401 and the second inspection electrode 402 are deactivated.

Figure 10:
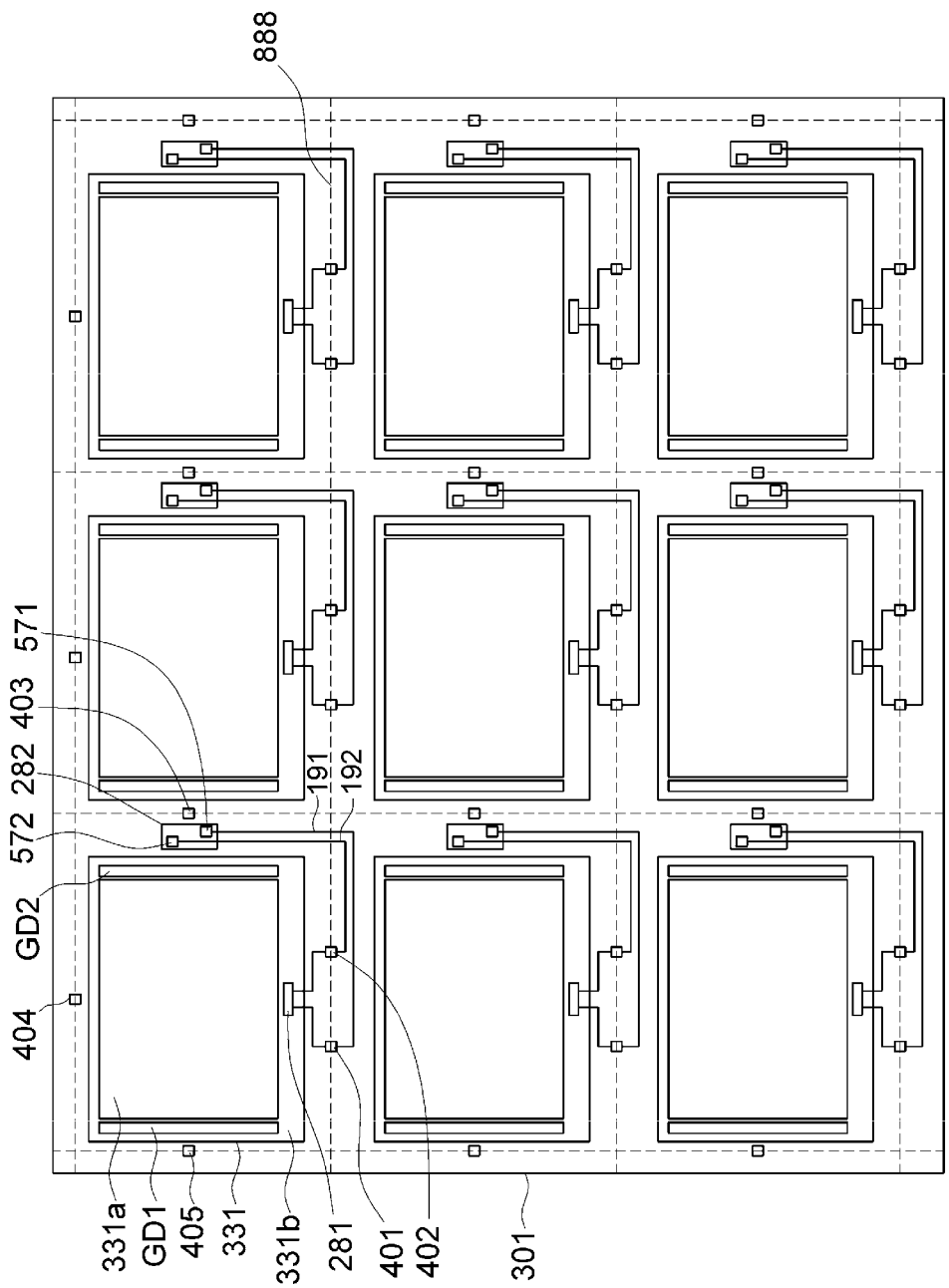
FIG. 10 is a view of a part of a first mother substrate according to another exemplary embodiment.

FIG. 10 is a view illustrating a part of a first mother substrate according to another exemplary embodiment.

Three or more inspection electrodes may be disposed at the shot boundary portion 888 of the mask, which surrounds the first display substrate 331 of the mother substrate. In this manner, the location of a short circuit of the signal lines may be identified more accurately.

For example, when a first inspection electrode 401, a second inspection electrode 402, a third inspection electrode 403, a fourth inspection electrode 404, and a fifth inspection electrode 405 are provided at different positions in the shot boundary portion 888 of the mask, the first inspection electrode 401, the second inspection electrode 402, the third inspection electrode 403, the fourth inspection electrode 404, and the fifth inspection electrode 405 may be respectively connected to different data lines.

More particularly, the first inspection electrode 401 is connected to (5 k−1)-th data lines through the first connection line 881, (5 k−1)-th extension lines connected in common to the first connection line 881, and (5 k−1)-th fan-out lines respectively connected to the (5 k−1)-th extension lines, where k is a natural number. The (5 k−1)-th fan-out lines are connected to the (5 k−1)-th data lines, respectively.

In addition, the second inspection electrode 402 is connected to (5 k−2)-th data lines through the second connection line 882, (5 k−2)-th extension lines connected in common to the second connection line 882, and (5 k−2)-th fan-out lines respectively connected to the (5 k−2)-th extension lines. The (5 k−2)-th fan-out lines are connected to the (5 k−2)-th data lines, respectively.

In addition, the third inspection electrode 403 is connected to (5 k−3)-th data lines through a third connection line, (5 k−3)-th extension lines connected in common to the third connection line, and (5 k−3)-th fan-out lines respectively connected to the (5 k−3)-th extension lines. The (5 k−3)-th fan-out lines are connected to the (5 k−3)-th data lines, respectively.

In addition, the fourth inspection electrode 404 is connected to (5 k−4)-th data lines through a fourth connection line, (5 k−4)-th extension lines connected in common to the fourth connection line, and (5 k−4)-th fan-out lines respectively connected to the (5 k−4)-th extension lines. The (5 k−4)-th fan-out lines are connected to the (5 k−4)-th data lines, respectively.

In addition, the fifth inspection electrode 405 is connected to 5 k-th data lines through a fifth connection line, 5 k-th extension lines connected in common to the fifth connection line, and 5 k-th fan-out lines respectively connected to the 5 k-th extension lines. The 5 k-th fan-out lines are connected to the 5 k-th data lines, respectively.

In addition, the five inspection electrodes 401 to 405 may be connected to five pad connection lines, respectively, and the five pad connection lines may be connected to five short portions, respectively, and the five short portions may be connected to five dummy electrodes, respectively.

In an exemplary embodiment, the lower inspection electrode 401a may be disposed on a layer substantially the same as a layer on which the data line DL is disposed. In this case, the lower inspection electrode 401a may include a material substantially the same as a material included in the data line DL.

According to a method of manufacturing a display device in one or more exemplary embodiments, the location of the signal lines that are short-circuited with the common line may be accurately detected.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of manufacturing a display device, the method comprising:
forming, on a first mother substrate, a plurality of pixels comprising a plurality of pixel electrodes, a plurality of gate lines connected to the pixels, and a plurality of data lines connected to the pixels;
dividing the data lines into a plurality of groups, and connecting the data lines of the same group to one connection line;
forming a plurality of inspection electrodes on a portion of the first mother substrate overlapping a shot boundary portion of a mask, the inspection electrodes connected to a plurality of connection lines, respectively;
preparing a second mother substrate;
forming a common electrode on the second mother substrate;
forming a mother panel comprising the first and second mother substrates and a liquid crystal layer between first and second display substrates, the first and second mother substrates bonded to each other such that the inspection electrodes and the pixel electrodes face the is common electrode;
applying a first voltage to the common electrode and applying a second voltage different from the first voltage to the inspection electrodes; and
determining whether the inspection electrodes and the common electrode are short-circuited based on an image displayed in a display area of the mother panel.

2. The method of claim 1, further comprising applying a first voltage to the common electrode, applying a second voltage different from the first voltage to the plurality of inspection electrodes, and then irradiating the mother panel with ultraviolet light.

3. The method of claim 1, wherein:
at least one of the inspection electrodes comprises:
a lower inspection electrode disposed on the first mother substrate and overlapping the shot boundary portion of the mask;
an upper inspection electrode disposed on the lower inspection electrode; and
an insulating layer disposed between the upper inspection electrode and the lower inspection electrode; and
the upper inspection electrode is connected to the lower inspection electrode through a contact hole of the insulating layer.

4. The method of claim 3, wherein the lower inspection electrode and the gate lines are disposed on the same layer.

5. The method of claim 3, wherein the lower inspection electrode and the data lines are disposed on the same layer.

6. The method of claim 3, wherein the upper inspection electrode and the pixel electrodes are disposed on the same layer.

7. The method of claim 1, wherein the liquid crystal layer comprises liquid crystal molecules and a prepolymer.

8. The method of claim 7, wherein the prepolymer comprises a reactive mesogen.

9. The method of claim 1, further comprising forming a plurality of pad electrodes on the first mother substrate between an edge of the first mother substrate and the shot boundary portion of the mask,
wherein the pad electrodes are connected to the inspection electrodes.

10. The method of claim 9, further comprising forming a plurality of pad connection lines on the first mother substrate,
wherein the pad connection lines connect the pad electrodes to the inspection electrodes.

11. The method of claim 9, further comprising forming a plurality of dummy electrodes on a surface of the second mother substrate facing the first mother substrate,
wherein the dummy electrodes are connected to the pad electrodes, respectively.

12. The method of claim 11, further comprising forming a short portion and a sealing portion between the pad electrode and the dummy electrode that correspond to each other.

13. The method of claim 12, wherein the sealing portion comprises a conductive ball.

14. The method of claim 11, wherein each of the dummy electrodes has a concavo-convex shape.

15. The method of claim 11, wherein respective surfaces of two adjacent dummy electrodes that face each other have a concavo-convex shape.

16. The method of claim 15, wherein a convex portion of one dummy electrode and a concavo portion of an adjacent dummy electrode face each other.

17. The method of claim 11, wherein forming the common electrode and the dummy electrodes comprises:
forming an opposing electrode on the second mother substrate; and
cutting the opposing electrode to form the common electrode and the dummy electrodes separated from each other.

18. A method of detecting a short circuit between at least one signal line and a common electrode of a display device, the method comprising:
forming a plurality of first display substrates on a first mother substrate, each first display substrate comprising a plurality of signal lines;
connecting a first group of signal lines to a first connection line and connecting a second group of signal lines to a second connection line;
forming first and second inspection electrodes on a portion of the first mother substrate overlapping a shot boundary portion of a mask, the first and second inspection electrodes connected to the first and second connection lines, respectively;
forming a plurality of second display substrates on a second mother substrate, each second display substrate comprising a conductive layer;
separating the conductive layer to form a common electrode, a first dummy electrode, and a second dummy electrode, the first and second dummy electrodes connected to the first and second inspection electrodes, respectively;
forming a liquid crystal layer between the first and second display substrates; and
applying a first voltage to the common electrode, and a second voltage different from the first voltage to the first and second dummy electrodes.

19. The method of claim 18, wherein the first and second dummy electrodes are disposed between adjacent common electrodes in a plan view.

20. The method of claim 18, further comprising blocking a portion of the mask that corresponds to the first inspection electrode to disconnect the first inspection electrode, after the first and second voltages are applied.

* * * * *